(12) United States Patent
Kim et al.

(10) Patent No.: US 6,633,318 B1
(45) Date of Patent: Oct. 14, 2003

(54) SCREEN SAVER HAVING MESSAGE MANAGEMENT FUNCTION AND METHOD THEREFOR

(75) Inventors: Young-jun Kim, Seoul (KR); Seong-dong Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 404 days.

(21) Appl. No.: 09/219,876

(22) Filed: Dec. 24, 1998

(30) Foreign Application Priority Data

Dec. 26, 1997 (KR) .......................... 1997-74454

(51) Int. Cl.[7] .............................................. G09G 5/00
(52) U.S. Cl. ...................................... 345/867; 345/764
(58) Field of Search ............................... 345/326, 329, 345/333, 332, 344, 867, 700, 733, 762, 759, 790, 764, 750; 707/104

(56) References Cited

U.S. PATENT DOCUMENTS

| | | | |
|---|---|---|---|
| 5,550,968 A | 8/1996 | Miller et al. ................. 345/332 |
| 5,738,527 A | 4/1998 | Lundberg .................... 434/322 |
| 5,819,284 A | 10/1998 | Farber et al. ................ 707/104 |
| 5,852,436 A | * 12/1998 | Franklin et al. ............ 345/326 |
| 5,892,856 A | * 4/1999 | Cooper et al. .............. 382/291 |
| 6,067,570 A | * 5/2000 | Kreynin et al. ............. 709/227 |
| 6,078,820 A | * 6/2000 | Wells et al. ................. 455/466 |
| 6,111,517 A | * 8/2000 | Atick et al. ............. 340/825.34 |

* cited by examiner

Primary Examiner—Raymond J. Bayerl
Assistant Examiner—Tadesse Hailu
(74) Attorney, Agent, or Firm—Robert E. Bushnell, Esq.

(57) ABSTRACT

A screen saver having a function of managing a message for a computer system user, created by another user, and a method therefor are provided. The screen saver includes a screen saving portion for monitoring a state of a screen output to a display device provided in the computer system, an event detector for detecting an event input from an input device provided in the computer system, a password input portion for receiving a password from the user if the event detector detects the event, displaying the screen displayed immediately before the screen state is changed into the screen saving state if the password received from the user is identical with a prestored password, and changing the screen state into the screen saving state if not, and a message input portion for receiving a message from the user if the event detector detects an event, storing the message in a storage means provided in the computer system, and changing the screen state into a screen saving state. Therefore, when the computer system is in a screen protection mode and even when the user password of the user of the computer system is not known, another person can inform the user of a useful message using the computer system.

11 Claims, 4 Drawing Sheets

SCREEN SAVER HAVING MESSAGE MANAGEMENT FUNCTION AND METHOD THEREFOR

CLAIM OF PRIORITY

This application makes reference to, incorporates the same herein, and claims all benefits accruing under 35 U.S.C. §119 from an application for SCREEN SAVER HAVING MESSAGE MANAGEMENT FUNCTION AND METHOD THEREFOR earlier filed in the Korean Industrial Property Office on Dec. 26, 1997 and there duly assigned Ser. No. 74454/1997.

BACKGROUND OF THE INVENTION

1. Field of the Invention

The present invention relates to the field of computer graphics processing, and more particularly to computer screen savers.

2. Description of the Related Art

In general, when a computer system is turned on, the same information may remain displayed and the computer screen state may remain fixed for long periods without change. A screen saver is software provided in an operating system which provides the function of changing the state of the screen for the purpose of preventing the life of the computer monitor from being shortened; an additional function is preventing secret information from being divulged to others by virtue of the information being continuously output even when the information displayed on the screen is not currently in actual use.

A conventional screen saver enters into a screen saving state in which a screen saver image is displayed or the screen stops displaying an image, in the case when the computer system displays the same information on the screen for a predetermined time of about 1 to 10 minutes. Then, if a user of the computer system inputs information through an input device such as a keyboard or a mouse, the screen saver terminates the screen saving state, displays again the last screen displayed immediately before the screen was changed into the screen saving state, and control of the computer system is returned to the process of controlling the computer system which was in effect immediately before the screen saving state was initiated.

A conventional screen saver includes a password input portion to identify a password of a user before displaying again the last screen immediately before the screen saving state was initiated. When the computer system is in a screen saving state, there may be a case that a person wishes to transmit a useful message to the user of the computer system, by using the computer system. In such a case, if the person does not know a password of the user set on the conventional screen saver, he/she cannot transmit any useful message using the computer system.

An example of a system of the conventional art in which password protection is provided to restrict access to a graphical user interface is seen in U.S. Pat. No. 5,550,968, to Miller et al. entitled Method And System For Providing Access Security To Controls In A Graphical User Interface. This patent, however, discusses neither a screen saver nor a message function.

Example of screen savers of the conventional art are seen in U.S. Pat. No. 5,738,527, to Lundberg, entitled Screen Saver, and U.S. Pat. No. 5,819,284, to Farber et al., Entitled Personalized Real Time Information Display As A Portion of A Screen Saver. Neither of these patents, however, discusses a message function or a password function of the screen saver.

Based on my observation of the art, I have discovered that what is needed is a screen saver for a computer which allows a person other than the computer user to leave a message for the user using the computer. Such a screen saver would protect the computer monitor and provide security for the user's data, yet would still allow the computer to be used for storing and transmitting messages.

SUMMARY OF THE INVENTION

It is therefore an object of the present invention to provide an improved screen saver for a computer system.

It is another object of the present invention to provide a screen saver for a computer system which allows for the input of messages for the user of the computer.

It is a further object to provide a screen saver for the computer system which provides security for the input messages.

Accordingly, to achieve the above objects, there is provided a screen saver provided in a computer system, having message management function, including: a screen saving portion for monitoring a state of a screen output to a display device provided in the computer system, an event detector for detecting an event input from an input device provided in the computer system, and a message input portion for receiving a message from the user if the event detector detects an event, storing the message in a storage means provided in the computer system, and changing the screen state into a screen saving state.

According to another aspect of the present invention, there is provided a method for managing a message using a screen saver provided in an operation system of a computer system, comprising the steps of (a) detecting an event input from an input device provided in the computer system in a screen saving state supplied by the screen saver, (b) receiving the message from a user if the event is detected in step (a), (c) storing the message input in step (b) on a storage means provided in the computer system and returning the routine to step (a), (d) receiving a password from the user if the event is detected in step (a), and (e) outputting the message stored in step (c) on the screen if the password input in step (d) is identical with the prestored password, and returning to step (a) if not.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
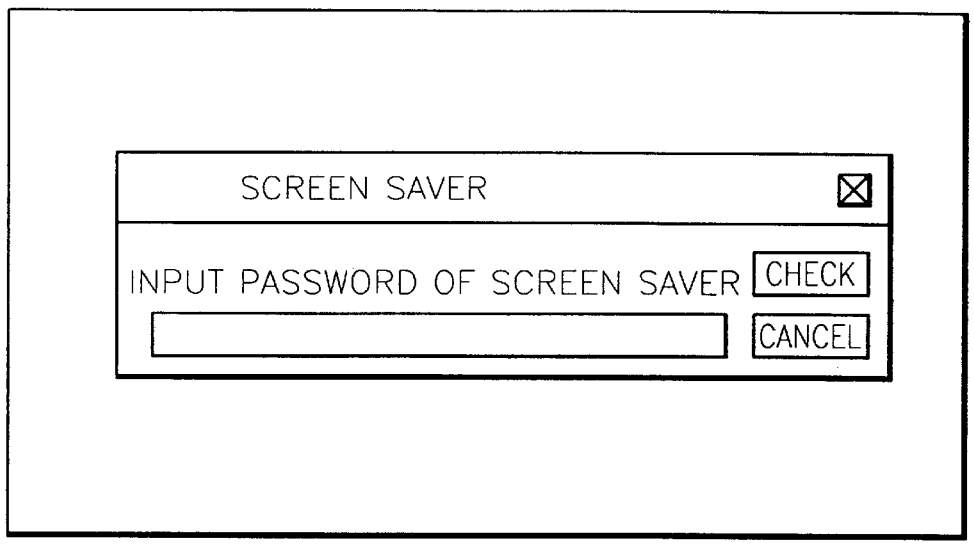
FIG. 1 illustrates a password input screen image displayed in a conventional screen saver.

Turning now to the drawings, FIG. 1 shows an exemplary screen image displayed by the password input portion provided in the conventional screen saver. A conventional screen saver includes a password input portion to identify a password of a user before displaying again the last screen immediately before the screen saving state was initiated.

When the computer system is in a screen saving state, however, there may be a case that a person wishes to transmit a useful message to the user of the computer system, by using the computer system. In such a case, if the person does not know a password of the user set on the conventional screen saver, he/she cannot transmit any useful message using the computer system.

Figure 2:
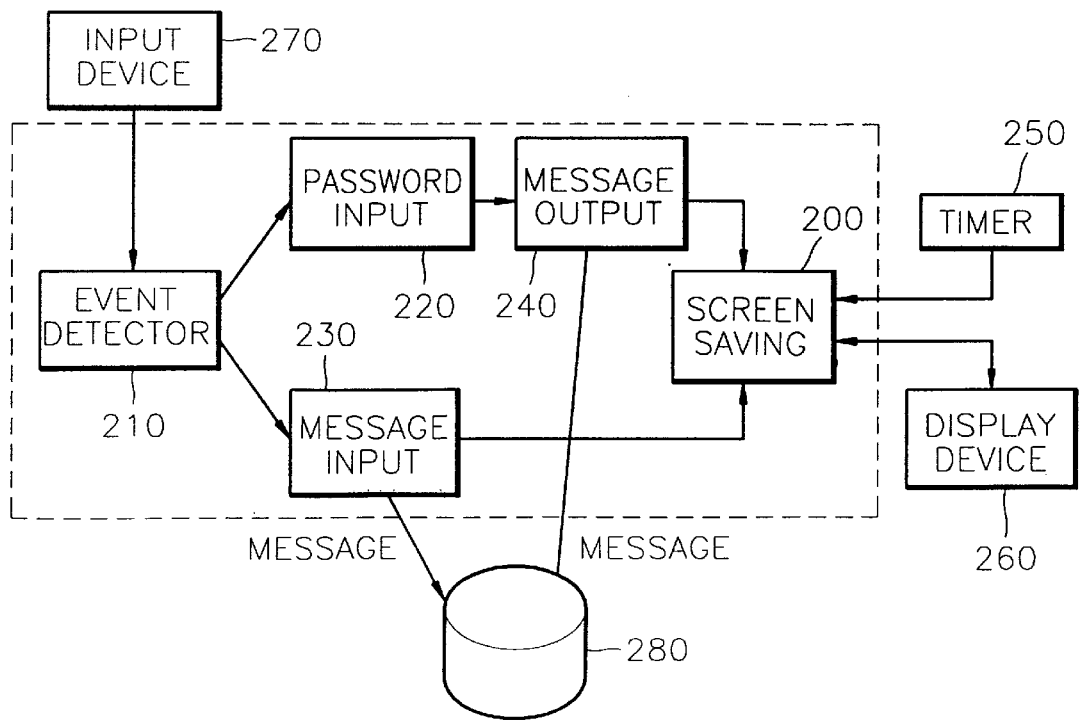
FIG. 2 is a block diagram of a screen saver having a message management function according to the present invention.

Hereinbelow, the present invention will be described in detail with reference to the accompanying drawings. Referring to FIG. 2, a screen saver according to the present invention includes screen saving portion 200, event detector 210, password input portion 220, message input portion 230 and message output portion 240. Screen saving portion 200 monitors a state of the screen output to display device 260 included in the computer system. Then, if the same information is displayed for a predetermined time which may be, for example, in the range of approximately 1 to 10 minutes, the screen state is changed into a screen saving state. In the screen saving state, a predetermined screen saved by a user is displayed to display device 260 or a screen displaying is stopped.

Event detector 210 detects an event input from input device 270 such as a key board or a mouse in the screen saving state. If the event is detected by event detector 210, password input portion 220 displays a password input screen shown in FIG. 4 and receives a password from the user. At this time, if the password received from the user is identical with a prestored password, password input portion 220 displays the screen displayed immediately before the screen state was changed into the screen saving state by screen saving portion 200, and control of the computer system is returned to the process of controlling the computer system which was in effect immediately before the screen saving state was initiated. On the other hand, if the password received from the user is not identical with a prestored password, the screen state is again changed into the screen saving state.

If event detector 210 detects an event, message input portion 230 receives a message from the user, stores the message in a storage means such as hard disk device 280, and changes the screen state, initiating the screen saving state. Message output portion 240 outputs the message stored in the storage means by message input portion 220 by a user's selection, before the screen displayed immediately before the screen saving state is initiated is displayed by password input portion 220.

The screen saver according to the present invention which is a software which may form part of an operating system of a computer system is stored in hard disk device 280 and is loaded on a main memory when the computer system is booted to be executed by the control of a processor. In this embodiment of the present invention, it is assumed that the message input by message input portion 230 and later output by message output portion 240 is basically a text message. However, the message may take the form of an audio message in the case when a computer having the screen saver according to the present invention further includes a microphone and a speaker, or a video message in the case when the computer further includes a camera.

Figure 3:
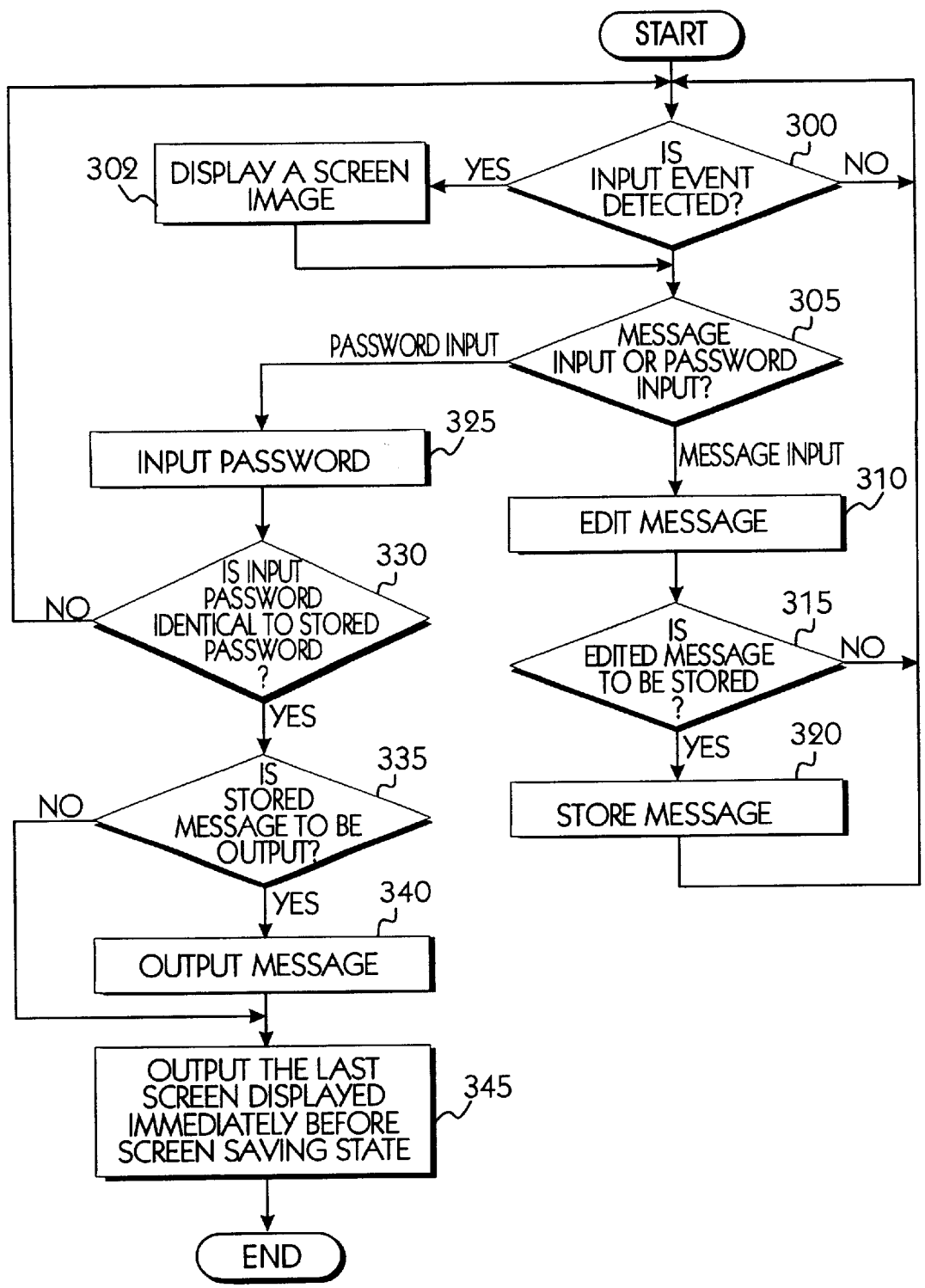
FIG. 3 is a flow diagram illustrating a message management procedure of the screen saver according to the present invention.
Figure 4:
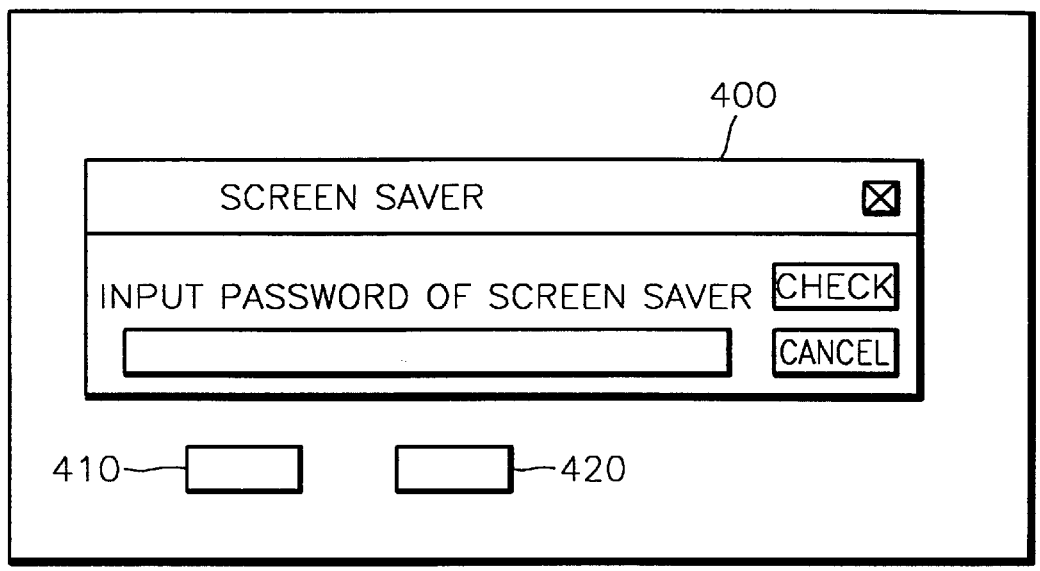
FIG. 4 illustrates an exemplary screen image displayed after an event is detected by the screen saver according to the present invention.

Referring to FIG. 3, a message processing procedure according to the screen saver of the present invention will be described as follows. In a screen saving state, which is supplied by the screen saver, event detector 210 continuously detects events input from input device 270 such as a key board or a mouse (step 300). If an event is detected in step 300, step 302 is carried out and the screen shown in FIG. 4 is displayed. Reference numeral 400 represents a window for receiving a password, reference numeral 410 represents a window indicating whether a message stored by the screen saver is present or not, and reference numeral 420 represents an icon for calling the message input portion 230. Thus, if icon 420 is clicked using the mouse for the purpose of storing the message, the screen shown in FIG. 5 is displayed (step 305).

Figure 5:
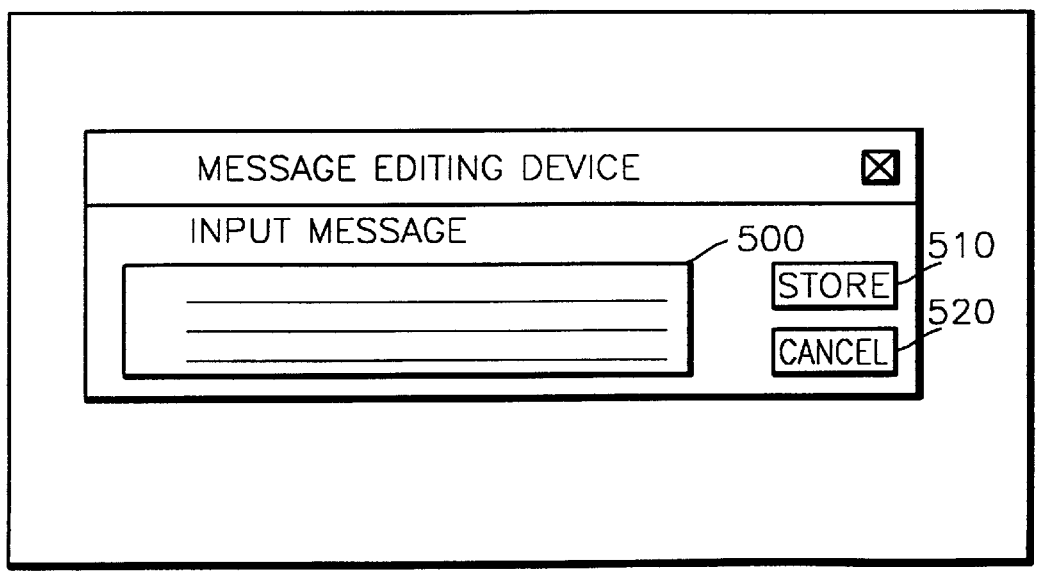
FIG. 5 illustrates an exemplary screen image for editing a message in the screen saver according to the present invention.

According to the embodiment of the present invention, message input portion 230 includes a message editing device, as shown in FIG. 5. The user edits the message on message input window 500 through the key board. Also, in the present invention, message input portion 230 may call a conventional word processor to supply an environment where the user can edit the message (step 310).

If the user clicks "store" button 510 using a mouse cursor, the received message is stored with a file name of, for example, msg?.txt (Here, the question mark (?) corresponds to 1, 2, 3, . . . according to the order of the messages.) in directory c:\msglist. On the other hand, if the user does not want to store the message, "cancel" button 520 is clicked. If the message is stored in hard disk device 280 or "cancel" button 520 is clicked, message input portion 230 changes the screen state into a screen saving state (steps 315 and 320), and control of the screen saver returns to step 300.

Figure 6:
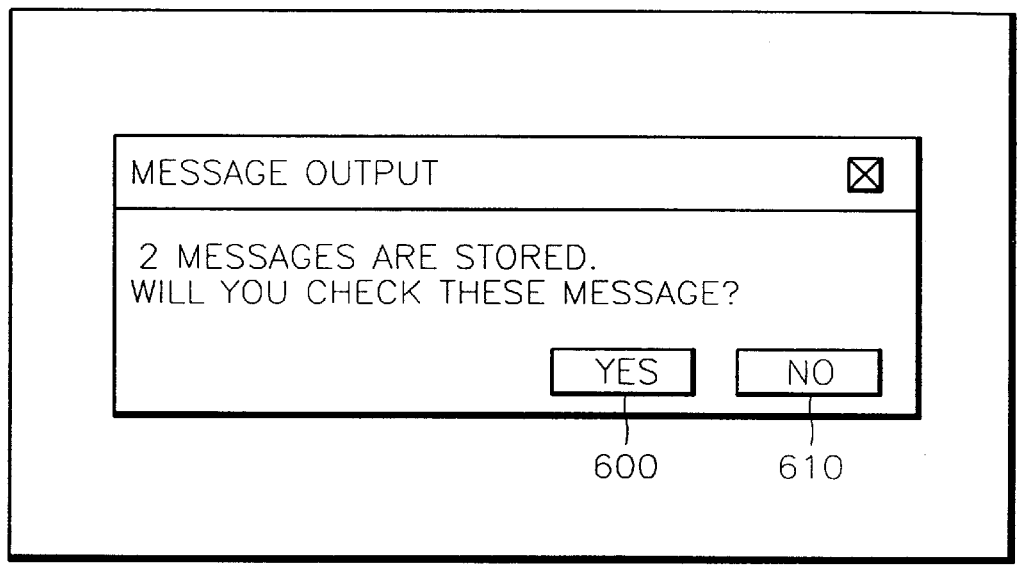
FIG. 6 illustrates an exemplary screen image for checking whether a user intends to output the messages stored in the screen saver according to the present invention.

If the user inputs a password through window 400 for receiving the password, password input portion 230 checks whether the password input by from the user is identical with the prestored password (steps 325 and 330). If the two passwords are not identical with each other, password input portion 230 changes the screen into the screen saving state and the control of the screen saver routine returns to step 300. If the two passwords are identical with each other, the screen shown in FIG. 6 is displayed to ask the user a question whether or not the user check the stored message (step 335).

Figure 7:
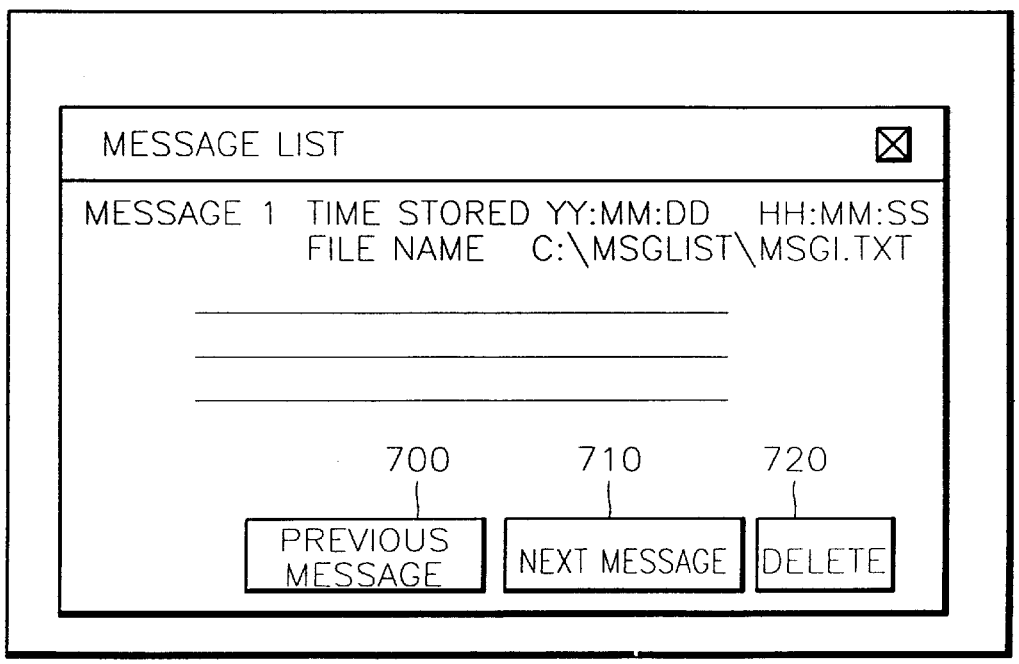
FIG. 7 illustrates an exemplary message output screen image in the screen saver according to the present invention.

If the user selects "yes" button 600, the screen shown in FIG. 7 is displayed to output the message stored in step 320 on the screen (step 340). The user may select "previous message" button 700 to display again the message previously displayed. Otherwise, the user may select "next message" button 710 to display messages continuously. Also, the user may select "delete" button 720 to delete the currently displayed message from hard disk device 280. If the user selects "no" button 610, the screen displayed immediately before the screen state is changed into the screen saving state is displayed and the control of the computer system returns to the process of controlling the computer system immediately before the screen saving state is initiated (step 345).

According to the present invention, when the computer system is in a screen protection mode and even when the user password of the computer system is not known, another person can inform the user of a useful message using the computer system.

What is claimed is:

1. A method of managing a message on a computer having a screen, comprising the steps of:

continuously monitoring the computer screen;

if no change in the data displayed on the computer screen is detected for a predetermined amount of time, then displaying a screen saver image on said computer screen;

when the computer screen displays said screen saver image and when input is detected from an input device, displaying a first input window on the computer screen;

when said first input window is displayed, if a first particular input is detected, displaying a message input window, then storing message data input while the message input window is displayed, then displaying said screen saver image; and when said first input window is displayed, if a second particular input is detected, then displaying said stored message data.

2. The method of claim 1, further comprising the steps of:

when said first input window is displayed, detecting an input password input from said input device;

only if said input password is identical to a stored password, displaying said stored message data.

3. The method of claim 2, further comprising the steps of:

only if said input password is identical to a stored password, redisplaying said data which were displayed on the computer screen unchanged during said predetermined amount of time.

4. The method of claim 1, further comprising the steps of:

when said first input window is displayed and said second particular input is detected, displaying a message output window indicating the number of messages stored; and when a third particular input is received, then displaying the stored messages.

5. The method of claim 1, where the computer comprises a microphone and said input message is an audio message.

6. The method of claim 1, where the computer comprises a video camera and said input message is a video message.

7. A computer system, comprising:

a computer screen connected to a computer;

an input device connected to said computer;

means for monitoring the image displayed on said computer screen;

means for displaying a screen saver image on said computer screen;

means for displaying a first input window when said screen saver image is displayed and when any input is detected from said input device:

means for displaying a message input window and storing a message input through said input device in response to a first particular input from the input device when said first input window is being displayed on said computer screen; and means for displaying said stored message in response to a second particular input from the input device when said first input window is being displayed on said computer screen.

8. The computer system of claim 7, further comprising:

means for comparing an input password input with a stored password when said first input window is being displayed and for displaying said stored message only if said input password is the same as said stored password.

9. The computer system of claim 7, further comprising:

a microphone;

means for storing an audio message input through said microphone when said first input window is being displayed on said computer screen;

means for displaying said stored audio message at a time after said message is stored.

10. The computer system of claim 7, further comprising:

a video camera;

means for storing a video message input through said video camera when said first input window is being displayed on said computer screen;

means for displaying said stored video message at a time after said message is stored.

11. A computer-readable storage medium having a screen saver program recorded thereon, said screen saver program comprising:

a screen saving module for continuously monitoring a computer screen and displaying a screen saver image on the computer screen if no change in the data displayed on the computer screen is detected for a predetermined amount of time;

an event detecting module for detecting an event input from a computer input device and for displaying a first input window on the computer screen when the computer screen displays said screen saver image and when input is detected from an input device;

a password inputting module for displaying a message input window if a first particular input is detected;

a message inputting module for storing message data input while the message input window is displayed, then displaying the screen saver image on the computer screen; and a message outputting module for displaying said stored message data when said first input window is displayed, if a second particular input is detected.

* * * * *